United States Patent [19]

Osawa et al.

[11] Patent Number: 4,554,961
[45] Date of Patent: Nov. 26, 1985

[54] WHEEL RIM WITH SPLIT LOCKING RING

[75] Inventors: Shigeru Osawa, Tokyo; Hisayoshi Yamoto, Yamato, both of Japan

[73] Assignee: Topy Industries Limited, Tokyo, Japan

[21] Appl. No.: 445,573

[22] Filed: Nov. 30, 1982

[30] Foreign Application Priority Data

Dec. 11, 1981 [JP] Japan .................................. 56-199551

[51] Int. Cl.⁴ .............................................. B60B 25/04
[52] U.S. Cl. .................................. 152/410; 301/35 SL
[58] Field of Search ............. 301/23, 35 SL; 152/401, 152/402, 405, 409, 410, DIG. 10

[56] References Cited

U.S. PATENT DOCUMENTS 1,710,614 4/1929 Furrer ............................. 152/409 X
3,623,530 11/1971 Beyers et al. ....................... 152/410

FOREIGN PATENT DOCUMENTS 21327 6/1956 Fed. Rep. of Germany ...... 152/410
1073650 9/1954 France ................................. 152/410
586708 12/1958 Italy .................................... 152/409

Primary Examiner—David A. Scherbel
Attorney, Agent, or Firm—Fleit, Jacobson, Cohn & Price

[57] ABSTRACT

A bottom surface portion of a lockring groove defined by a rim base is formed to be an inclined surface on which a load in a radial direction acts through a lockring. A leg portion of the lockring having an annular body engaged thereto is formed to be an inclined surface so as to abut the inclined surface of the lockring groove defined by the rim base.

5 Claims, 4 Drawing Figures 4,554,961

WHEEL RIM WITH SPLIT LOCKING RING

BACKGROUND OF THE INVENTION

This invention relates to a wheel rim of an assembling system installed on a rimbase for a pneumatic tire and a side flange on the movable side of a lockring. The lockring has a cutting portion on the periphery of the lockring having breaks between discontinuous portions of the lockring; the rimbase interconnected through the lockring to a bead seat band.

Heretofore, such kind of wheel rim has generally a structure consisting of a rimbase 1, a side flange 2, a bead seat band 3, a lockring 4 and a O-ring 5 as shown in FIG. 1. However, in the conventional example described above, the lockring 4 is adapted to form a leg portion 4a engaged in a lockring groove 6 and a surface 4b positioned across a gutter edge 7 of the rimbase 1, and a sectional shape having an inclined surface 4c of about 45° at another side as shown in FIG. 2. When compressed air is filled in the tire, a side pressure acts on the bead seat band 3 toward the outside through the side flange 2 on the movable side and the side of the lockring groove 6 of the rimbase 1 is pressed toward the outside through the lower inclined portion of the bead seat band 3 and the inclined surface 4c of the lockring 4. By this, the component force of side pressure of said inclined surface 4c supplies a force in a radial direction to a gutter edge 7 by said side pressure, whereby the tire is engaged.

In other words, the side pressure F caused by the pressure of tire acts on the side wall of the lockring groove 6 in the rim base 1 and a component force in the radial direction of the side pressure of the inclined surface 4C in the lockring 4 acts on the gutter edge surface 7 as a pressure P. Futher, said gutter edge surface 7 is subjected to a variable load of a vertical load which acts on the tire.

Accordingly, an edge portion a of the bottom of the lockring groove 6 in the rimbase 1 is subjected to a great stress by F and P+W and the like, thereby there exists a problem such as the occurrence of a crack b due to a fatigue breakdown.

BRIEF SUMMARY OF THE INVENTION

This invention is performed to amend the conventional defects described above. In other words, the object of this invention is to provide a wheel rim which is possible to safely secure the stress in order to prevent fatigue breakdown caused by stress concentration.

Examples in accordance with this invention will be described in detail with reference to FIG. 3 and FIG. 4. In the drawings, parts corresponding to the conventional example are described with the same characters.

DETAILED DESCRIPTION OF THE INVENTION

Figure 1:
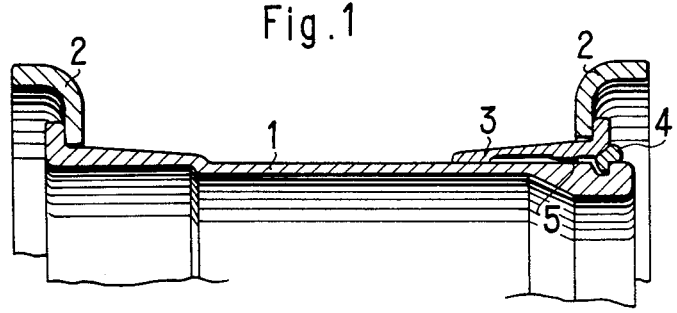
FIG. 1 is a sectional view of the conventional wheel rim.
Figure 2:
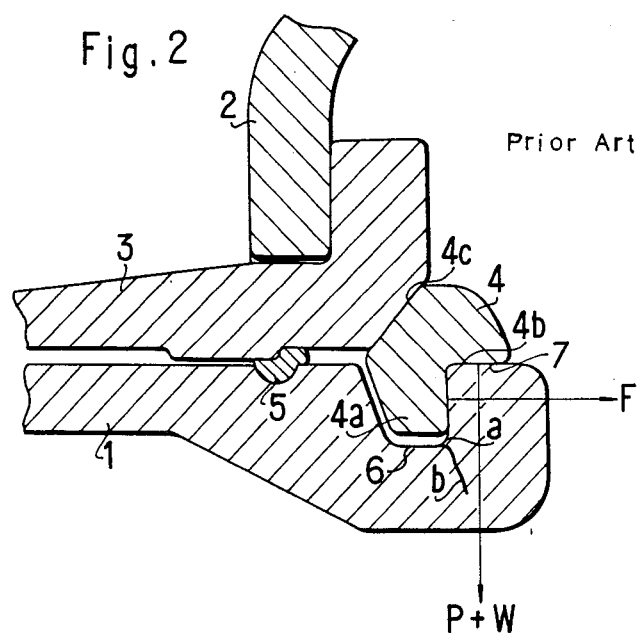
FIG. 2 is a grossly enlarged sectional view which shows an essential part of FIG. 1.
Figure 3:
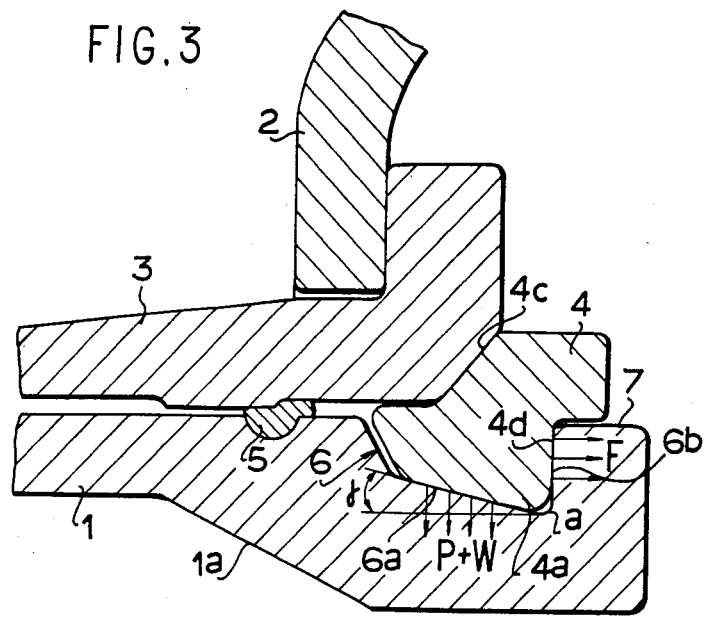
FIG. 3 is a sectional view of the essential part in the wheel rim which shows an example of this invention and FIG. 4 is a sectional view of the essential part in another example of this invention.

FIG. 3 is a sectional view of the important part of the gutter side of an embodiment of this invention, wherein the bottom portion of the lockring groove 6 in the rimbase 1 forms an inclined surface 6a subjected to a load in the radial direction through the lockring 4, the leg portion 4a of said annular lockring 4 having a cutting portion (not shown) on the periphery of the lockring having breaks between discontinuous portions of the lockring engaged thereto forming an inclined surface so as to abut to the inclined surface 6a of the lockring groove 6 in the rimbase 1. The inclined surface 6a has an axis and an inclined angle $\gamma$ with respect to the rimbase 1.

The outer side wall portion 6b of the standing portion of said lockring groove 6 and the outer side wall portion 4d of the lockring 4 abutting thereto are formed vertically.

Further, the bead seat band 3 is provided with an inclined surface abutting with the inclined surface 4c of the lockring 4 the same as the conventional construction.

Figure 4:
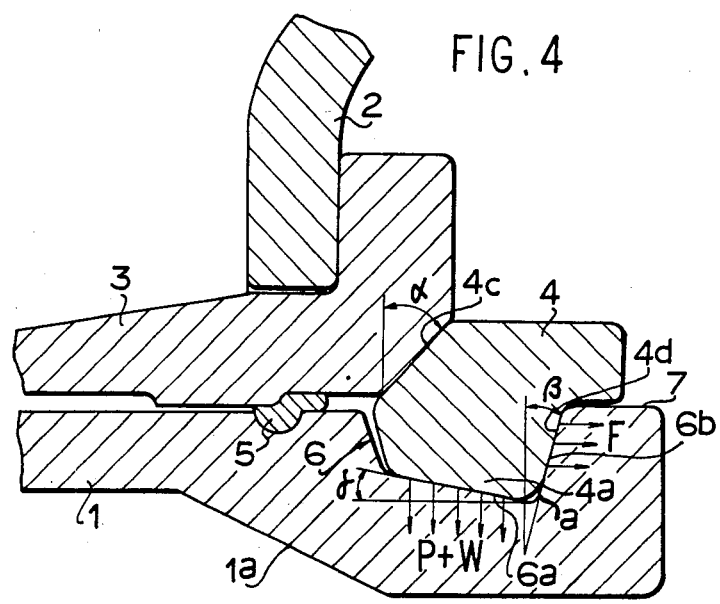

Another example of this invention is described in FIG. 4. FIG. 4 shows a case wherein the outer side portion 6b of the standing portion of said lockring groove 6 and the outer side wall portion 4a of the lockring 4 abutting thereto forms an inclined angle $\beta$, between both side walls.

Providing the inclined angle $\beta$ between the outer side wall portion 6b and 4d, makes the rolling work of the rim easy and enlarges the width of the surface subjected to the side pressure F. Further, if this width is constant, an increase of the thickness of a rimbase groove member is possible since this enables to be shallow the depth of the groove, thereby being capable of the increase in the strength.

Since said inclined angle $\beta$ allows the component force to occur in the radial direction against the axial direction, said inclined angle $\beta$ should be selected considering the strength of thickness with respect to the rolling work and the groove depth. It is desired to be within a range equivalent to a friction angle between members, especially 10° to 30°.

If the inclined angle $\beta$ is formed to be smaller than the inclined angle $\alpha$ of an inclined conical surface 4C in the lockring 4, it is possible to prevent the coming out of the lockring 4 from the lockring groove 6.

In the wheel rim thus constructed, the pressure on the tire side F acts on the outer side wall portion 6b of the lockring groove 6 in the rimbase when it is filled with a given air pressure after engaging the tire, while the load P in the radial direction and the vertical load of the tire W act on the inclined surface 6a of the bottom portion of the lockring groove 6 in the rimbase 1. Therefore, the stresses acting on the edge portion a of the lockring groove 6, are only caused by the moment of side pressure F, and the moment of the vertical force P+W, does not act thereon. Accordingly, excess stress concentration at edge portion a does not occur. Further, by providing the inclined angle $\gamma$ between the inclined surface 6a and the axis in the rimbase 1, the width of the surface abuts the bottom surface portion of the lockring groove in the lockring can be enlarged corresponding to the angle thereof together with the capability of increasing the thickness of the member between the lockring groove 6 and the inclined surface 1a in rimbase according to the inclined angle $\gamma$, thereby decreasing the load per unit area acting on the bottom portion. However, if the inclined angle γ becomes excessive, the axis component force toward the outside of the groove against the force in the radial direction occurs. Accordingly, the inclined angle γ is desirable to be smaller than that of the friction angle between members, especially 5° to 20°.

The abutting surface of the lockring to the bead seat band is not limited to the inclined conical surface shown in the examples described above, but an inclined circular surface is also possible.

The invention in accordance with this invention as described in detail, has no excess stress concentration point at the engaged portion of the lockring in the rimbase. Therefore, the strength of the rimbase increases, whereby the assembling of the wheel rim can be effected with safety and security.

What we claim is:

1. A wheel rim assembly comprising
   an annular rimbase for a pneumatic tire,
   a bead seat band,
   a lockring groove defined by the rimbase,
   a lockring located in said lockring groove interconnecting said annular rimbase and said bead seat band,
   said lockring groove having a first bottom surface inclined at a predetermined angle of between 5° and 20° with respect to the axis of said annular rimbase and a vertical side wall portion,
   said lockring having a second bottom surface substantially abutting said first bottom surface and an outer side wall portion substantially abutting said vertical side wall portion,
   said bead seat band having a first inclined conical surface,
   a second inclined conical surface defined by said lockring abutting said first inclined conical surface,
   a first edge portion defined by said lockring groove located between said first bottom surface and said vertical side wall portion, and
   a second edge portion defined by said lockring located between said second bottom surface and said outer side wall portion,
   said second edge portion being spaced from said first edge portion for dividing a force between axial side pressure forces transferred from said outer side wall portion to said vertical wall portion and radial pressure forces transferred from said second bottom portion to said first bottom portion when said pneumatic tire is inflated, the spacing between said first edge portion and second edge portion prevents movement of said lockring out of said lockring groove by rolling when said force is divided.

2. A wheel according to claim 1 further comprising an O-ring located between the bead seat band and the annular rimbase.

3. A wheel rim assembly comprising
   an annular rimbase for a pneumatic tire,
   a bead seat band,
   a lockring groove defined by the rimbase,
   a lockring located in said locking groove interconnecting said annular rimbase and said bead seat band,
   said lockring groove having a first bottom surface inclined at a predetermined angle of between 5° and 20° with respect to the axis of said annular rimbase and a side wall portion inclined at a predetermined angle of between 10° and 30° with respect to a line normal to the axis of said annular rimbase,
   said lockring having a second bottom surface substantially abutting said first bottom surface and an outer side wall portion substantially abutting said side wall portion,
   the bead seat band having a first inclined conical surface,
   a second inclined conical surface defined by said lockring abutting said first inclined conical surface,
   a first edge portion defined by said lockring groove located between said first bottom surface and said vertical side wall portion, and
   a second edge portion defined by said lockring located between said second bottom surface and said outer side wall portion,
   said second edge portion being spaced from said first edge portion for dividing a force between axial side pressure forces transferred from said outer side wall portion to said side wall portion and radial pressure forces transferred from said second bottom portion to said first bottom portion when said pneumatic tire is inflated, the spacing between said first edge portion and second edge portion prevents movement of said lockring out of said lockring groove by rolling when said force is divided.

4. A wheel rim assembly according to claim 3, wherein the angle formed by the adjoining side wall portion of the lockring groove and the angle formed by the abutting outer side wall portion of the lockring are smaller than an angle formed by the inclined conical surface of the lockring abutting the inclined conical surface of the bead seat band.

5. A wheel rim assembly according to claim 3 further comprising an O-ring located between the bead seat band and the annular rimbase.

* * * * *